(12) United States Patent
Sakamoto et al.

(10) Patent No.: US 7,468,399 B2
(45) Date of Patent: Dec. 23, 2008

(54) ANTIFOULING CONDENSATION CURING ORGANOPOLYSILOXANE COMPOSITION AND UNDERWATER STRUCTURE

(75) Inventors: Takafumi Sakamoto, Gunma-ken (JP); Masayuki Ikeno, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 403 days.

(21) Appl. No.: 11/224,122

(22) Filed: Sep. 13, 2005

(65) Prior Publication Data

US 2006/0058452 A1 Mar. 16, 2006

(30) Foreign Application Priority Data

Sep. 14, 2004 (JP) ............... 2004-266636

(51) Int. Cl.
*C09D 5/16* (2006.01)
(52) U.S. Cl. .................. 523/122; 524/96; 524/104; 524/236; 524/588; 428/447
(58) Field of Classification Search ................ 528/34, 528/21; 525/477; 523/122
See application file for complete search history.

(56) References Cited

U.S. PATENT DOCUMENTS 6,451,437 B1 * 9/2002 Amidaiji et al. ............. 428/447
6,593,413 B2 * 7/2003 Muramatsu et al. ......... 524/493

2004/0006190 A1 1/2004 Sakamoto et al.

FOREIGN PATENT DOCUMENTS

| JP | 56-076452 A | 6/1981 |
|---|---|---|
| JP | 56-076453 A | 6/1981 |
| JP | 58-013673 A | 1/1983 |
| JP | 62-84166 A | 4/1987 |
| JP | 63-043973 A | 2/1988 |
| JP | 3-255169 A | 11/1991 |
| JP | 2503986 B2 | 4/1996 |
| JP | 2952375 B2 | 7/1999 |

OTHER PUBLICATIONS

Endres F.,Zeitschrift fur Physikalische Chemie,2004, Allemagne, vol. 218, pp. 255-283.□□(Ionic liquids: Promising Solvents for Electrochemistry).*

* cited by examiner

*Primary Examiner*—Randy Gulakowski
*Assistant Examiner*—Olatunde S Ojurongbe
(74) *Attorney, Agent, or Firm*—Birch, Stewart, Kolasch & Birch, LLP

(57) ABSTRACT

An anti-fouling or fouling release condensation curing organopolysiloxane composition is provided comprising (A) a diorganopolysiloxane having at least two silicon atom-bonded hydroxyl and/or hydrolyzable groups in a molecule, (B) a silane having at least two hydrolyzable groups in a molecule and/or a partial hydrolytic condensate thereof, and (C) an ionic liquid, typically a fused salt. The composition cures to an underwater structure to form a coating which is non-toxic, non-detrimental to the environment, and effective for preventing aquatic organisms from depositing and growing thereon over a long term.

8 Claims, No Drawings

ANTIFOULING CONDENSATION CURING ORGANOPOLYSILOXANE COMPOSITION AND UNDERWATER STRUCTURE

CROSS-REFERENCE TO RELATED APPLICATION

This non-provisional application claims priority under 35 U.S.C. §119(a) on Patent Application No. 2004-266636 filed in Japan on Sep. 14, 2004, the entire contents of which are hereby incorporated by reference.

TECHNICAL FIELD

This invention relates to a room temperature-vulcanizable organopolysiloxane composition suitable as a coating material and more particularly, to an RTV organopolysiloxane composition which is applied to underwater structures (e.g., ships, harbor facilities, buoys, pipe lines, bridges, submarine stations, submarine oil well excavation units, power plant water conduits, fish culture nets and fixed shore nets) to form anti-fouling or fouling release coatings suitable for preventing aquatic organisms from depositing and growing on their surface. It also relates to an underwater structure coated with the composition.

BACKGROUND ART

Known in the art are a variety of room temperature-vulcanizable (RTV) silicone rubber compositions which cure into rubbery elastomers at room temperature. Rubbers resulting from such RTV compositions have improved weather resistance, durability, heat resistance and freeze resistance as compared with other organic rubbers and are thus used in a wide variety of fields. Especially in the building field, RTV compositions are often used for the bonding of glass plates, the bonding of metal and glass, the sealing of concrete joints and the like. Recently, RTV compositions newly find wide use as coating material for buildings, plants, water conduits (inclusive of inner and outer surfaces) and the like.

The organopolysiloxane on which RTV is based, however, has the nature of electrostatic charging and is thus likely to adsorb dust in air. This is problematic in that surfaces of cured sealing or coating materials are markedly fouled with the lapse of time, losing aesthetic appearance. One typical solution to this problem is by adding or incorporating surfactants having a polyoxyethylene group, sorbitan residue or disaccharide residue to RTV (see JP-A 56-76452 and JP-A 56-76453). To achieve fully satisfactory results by the above method, the surfactants must be added in large amounts, undesirably degrading the adhesion which is one important function of RTV sealing or coating materials.

Once underwater structures are installed or in service, aquatic organisms living in waters like sea and rivers such as barnacle, lamp chimney, serpula, mussel, Bryozoa, and seaweeds (e.g., Enteromorpha and Ulva) deposit and grow on splashed and submerged surface areas, causing various damages. In the case of a ship, for example, the deposition of organisms to the hull increases frictional resistance to water to reduce the speed. The fuel consumption must be increased to maintain a certain speed, which is uneconomical. If organisms deposit on structures of a harbor facility which are fixed at or below the water surface, it becomes difficult for the structures to exert their own function and sometimes, their substrates can be eroded. If organisms deposit on fish culture nets or fixed shore nets, net openings are clogged, eventually leading to the death of fishes.

Conventional means for preventing deposition and growth of aquatic organisms on underwater structures is the application to such structures of anti-fouling or fouling release paints having incorporated therein toxic anti-fouling or fouling release agents such as organotin compounds and cuprous oxide. Although such anti-fouling paints are effective for substantially preventing deposition and growth of aquatic organisms, the use of toxic anti-fouling or fouling release agents is harmful to the environmental safety and hygiene during preparation and application of paints. Additionally, the toxic anti-fouling or fouling release agent is slowly leached out of the coating in water, with the risk of contaminating the surrounding water area over a long term. For this reason, the use of toxic anti-fouling or fouling release agents was legally banned.

There have been proposed paint compositions which are effective for preventing deposition and growth of aquatic organisms, but free of toxic anti-fouling or fouling release agents. Paint compositions which are designed to impart anti-fouling or fouling release property by reducing the surface tension of coatings include non-toxic anti-fouling or fouling release paint compositions comprising RTV and liquid paraffin or petrolatum (see JP-A 58-13673 and JP-A 62-84166). Japanese Patent Nos. 2,503,986 and 2,952,375 disclose non-toxic anti-fouling or fouling release paint compositions comprising a reaction curing silicone resin and a less compatible, non-reactive, polar group-containing silicone resin wherein under the impetus of volume shrinkage associated with curing of the reaction curing silicone resin, the polar group-containing silicone resin bleeds out of the surface, which cooperates with the low surface tension of reaction curing silicone resin, to exhibit anti-fouling or fouling release property. These non-toxic anti-fouling or fouling release paint compositions, however, suffer from environmental safety and hygiene problems because the less compatible, non-reactive, polar group-containing silicone resin serving as bleed oil is a polyoxyethylene group-containing silicone resin in which ethylene oxide or propylene oxide is added to a silicon atom via a C—C bond or a silicone resin having an alkoxy group bonded to a silicon atom at a molecular end via an ethylene oxide or propylene oxide group.

SUMMARY OF THE INVENTION

An object of the present invention is to provide an anti-fouling or fouling release RTV organopolysiloxane composition which is applied to an underwater structure to form an anti-fouling or fouling release coating which is effective for preventing deposition and growth of aquatic organisms on a surface thereof, and maintains the effect over time and solves the environmental safety and hygiene problems. Another object is to provide an underwater structure coated with the composition.

Seeking for anti-fouling or fouling release additives having environmental safety and hygiene, the inventors have discovered that a satisfactory anti-fouling or fouling release effect is attained by adding an ionic liquid to an RTV organopolysiloxane composition.

The present invention addresses an anti-fouling or fouling release composition, with a primary focus on environmental safety and hygiene. Rather than oxyalkylene-modified silicones, methylphenylsilicone and dimethyldiphenylsilicone which are used as the bleed oil component in the prior art and for which only limited environmental safety data are available, the present inventors paid attention to additives for which full environmental safety data are available.

A study was made on a variety of ionic conductive compounds. Of these, quaternary ammonium salts are initially effective for preventing deposition and growth of aquatic organisms on a surface of an underwater structure, but cannot retain that effect and are thus impractical. In contrast, ionic liquids are effective for preventing deposition and growth of aquatic organisms on a surface of an underwater structure and do retain that effect over time. RTV organopolysiloxane compositions having the ionic liquids compounded therein form anti-fouling or fouling release coatings on underwater structures, which are effective for preventing deposition and growth of aquatic organisms on a surface thereof, maintains the anti-fouling or fouling release effect over a long time, and solves the environmental safety and hygiene problems.

Accordingly, the present invention provides an anti-fouling condensation curing organopolysiloxane composition comprising in admixture, (A) a base polymer in the form of a diorganopolysiloxane having at least two silicon atom-bonded hydroxyl and/or hydrolyzable groups in a molecule, (B) a silane having at least two hydrolyzable groups in a molecule and/or a partial hydrolytic condensate thereof, and (C) an ionic liquid in an amount of 0.01 to 30% by weight based on component (A).

The present invention also provides an underwater structure coated with the composition in the cured state.

The anti-fouling or fouling release RTV organopolysiloxane composition of the invention forms an anti-fouling or fouling release coating which is non-toxic and non-detrimental to the environment, and exhibits the anti-fouling or fouling release effect of preventing deposition and growth of aquatic organisms over a long term.

DESCRIPTION OF THE PREFERRED EMBODIMENTS

The anti-fouling or fouling release condensation curing organopolysiloxane composition of the invention is defined as comprising in admixture, components (A) to (C):

(A) a base polymer in the form of a diorganopolysiloxane having at least two silicon atom-bonded hydroxyl and/or hydrolyzable groups in a molecule, (B) a silane having at least two hydrolyzable groups in a molecule and/or a partial hydrolytic condensate thereof, and (C) an ionic liquid.

Component (A)

The diorganopolysiloxane serving as component (A) is a base polymer of the inventive anti-fouling or fouling release RTV organopolysiloxane composition of condensation curing type. The diorganopolysiloxane has at least two silicon atom-bonded hydroxyl and/or hydrolyzable groups in a molecule. Preferred diorganopolysiloxanes include diorganopolysiloxanes capped with hydroxyl and/or hydrolyzable groups at either end of their molecular chain, represented by the following general formula (1).

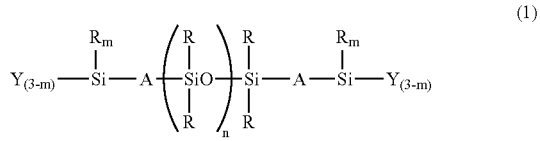

(1)

Herein R is independently a substituted or unsubstituted monovalent hydrocarbon group, A is independently an oxygen atom or a divalent hydrocarbon group of 1 to 8 carbon atoms, Y is independently a hydroxyl or hydrolyzable group, m is an integer of 0 to 2, and n is such a number that the diorganopolysiloxane has a viscosity of 20 to 1,000,000 mm²/s at 25° C.

Suitable substituted or unsubstituted monovalent hydrocarbon groups represented by R include alkyl groups such as methyl, ethyl, propyl, butyl, pentyl, hexyl, heptyl, octyl, nonyl, decyl and octadecyl; cycloalkyl groups such as cyclopentyl and cyclohexyl; alkenyl groups such as vinyl, allyl, butenyl, pentenyl and hexenyl; aryl groups such as phenyl, tolyl, xylyl and α- and β-naphthyl; aralkyl groups such as benzyl, 2-phenylethyl and 3-phenylpropyl; and substituted forms of the foregoing groups in which some or all hydrogen atoms are substituted with halogen atoms (e.g., F, Cl and Br) or cyano groups, such as 3-chloropropyl, 3,3,3-trifluoropropyl and 2-cyanoethyl. Of these, preferred substituent groups are methyl, vinyl and phenyl, with methyl being most preferred.

A is an oxygen atom or a divalent hydrocarbon group of 1 to 8 carbon atoms. Suitable divalent hydrocarbon groups include alkylene groups such as methylene, ethylene, propylene, methylethylene, butylene, and hexamethylene; cycloalkylene groups such as cyclohexylene; arylene groups such as phenylene, tolylene and xylylene; substituted forms of the foregoing groups in which some hydrogen atoms are substituted with halogen atoms; and combinations of the foregoing alkylene and arylene groups. Inter alia, oxygen and ethylene are preferred.

Examples of the hydrolyzable group, other than hydroxyl group, situated at ends of the molecular chain of the organopolysiloxane include alkoxy groups such as methoxy, ethoxy and propoxy; alkoxyalkoxy groups such as methoxyethoxy, ethoxyethoxy and methoxypropoxy; acyloxy groups such as acetoxy, octanoyloxy and benzoyloxy; alkenyloxy groups such as vinyloxy, isopropenyloxy and 1-ethyl-2-methylvinyloxy; ketoxime groups such as dimethylketoxime, methylethylketoxime and diethylketoxime; amino groups such as dimethylamino, diethylamino, butylamino and cyclohexylamino; aminoxy groups such as dimethylaminoxy and diethylaminoxy; and amide groups such as N-methylacetamide, N-ethylacetamide and N-methylbenzamide. Of these, alkoxy groups are preferred.

The subscript m is an integer of 0 to 2. Preferably, m is equal to 2 when Y is a hydroxyl group, and m is equal to 0 or 1 when Y is a hydrolyzable group.

The diorganopolysiloxane (A) should preferably have such a degree of polymerization as to provide a viscosity at 25° C. of 20 to 1,000,000 mm²/s, more preferably 100 to 500,000 mm²/s, even more preferably 1,000 to 50,000 mm²/s. If the diorganopolysiloxane has a viscosity of less than 20 mm²/s at 25° C., it may become difficult to form a coating having good physical and mechanical strength. If the diorganopolysiloxane has a viscosity of more than 1,000,000 mm²/s at 25° C., the composition may have too high a viscosity to process on use. It is noted that the viscosity is as measured at 25° C. by a rotational viscometer.

Illustrative, non-limiting examples of the diorganopolysiloxane (A) are given below.

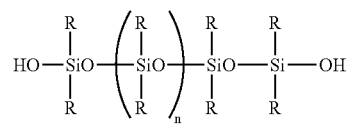

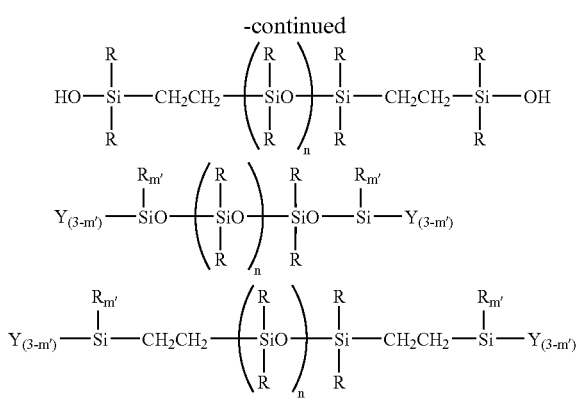

Herein, R and Y are as defined above, n is such a number that the diorganopolysiloxane has a viscosity of 20 to 1,000,000 mm²/s at 25° C., and m' is 0 or 1.

The diorganopolysiloxanes as component (A) may be used alone or in admixture of two or more.

Component (B)

Component (B) is a silane and/or a partial hydrolytic condensate thereof. It is essential for curing the inventive composition. The silane should have at least two hydrolyzable groups bonded to silicon atoms in a molecule. Preferred are silanes of the general formula (2) and/or partial hydrolytic condensates thereof.

$$R^1_a SiX_{4-a} \qquad (2)$$

Herein $R^1$ is each independently a substituted or unsubstituted monovalent hydrocarbon group of 1 to 6 carbon atoms, X is each independently a hydrolyzable group, and a is an integer of 0 to 2.

Examples of the hydrolyzable group represented by X are as exemplified for the hydrolyzable group Y, other than hydroxyl group, situated at ends of the molecular chain of diorganopolysiloxane (A). For X, alkoxy, ketoxime and isopropenoxy groups are preferred.

No particular limits are imposed on the silane and/or partial hydrolytic condensate as component (B) as long as it has at least two hydrolyzable groups in a molecule. Preferably, at least three hydrolyzable groups are contained in a molecule. A group other than the hydrolyzable group may be bonded to a silicon atom. The molecular structure may be either a silane or siloxane structure. In particular, the siloxane structure may be either straight, branched or cyclic.

The groups, other than the hydrolyzable group, represented by $R^1$ are substituted or unsubstituted monovalent hydrocarbon groups of 1 to 6 carbon atoms, examples of which include alkyl groups such as methyl, ethyl, propyl, butyl, pentyl and hexyl; cycloalkyl groups such as cyclopentyl and cyclohexyl; aryl groups such as phenyl and tolyl; aralkyl groups such as benzyl and 2-phenylethyl; alkenyl groups such as vinyl, allyl, butenyl, pentenyl and hexenyl; and halogenated alkyl groups such as 3-chloropropyl and 3,3,3-trifluoropropyl. Of these, methyl, ethyl, phenyl and vinyl are preferred.

Illustrative, non-limiting examples of the organosilicon compound (B) include ethyl silicate, propyl silicate, methyltrimethoxysilane, methyltriethoxysilane, vinyltrimethoxysilane, vinyltriethoxysilane, methyltris(methoxyethoxy)silane, vinyltris(methoxyethoxy)silane, methyltripropenoxysilane, methyltriacetoxysilane, vinyltriacetoxysilane, methyltri(methylethylketoxime)silane, vinyltri(methylethylketoxime)silane, phenyltri(methylethylketoxime)silane, propyltri(methylethylketoxime)silane, tetra(methylethylketoxime)silane, 3,3,3-trifluoropropyltri(methylethylketoxime)silane, 3-chloropropyltri(methylethylketoxime)silane, methyltri(dimethylketoxime)silane, methyltri(diethylketoxime)silane, methyltri(methylisopropylketoxime)silane, tri(cyclohexanoxime)silane, and partial hydrolytic condensates thereof. They may be used alone or in combination of two or more.

An appropriate amount of component (B) compounded is 0.5 to 20 parts by weight, more preferably 1 to 10 parts by weight per 100 parts by weight of component (A). Less than 0.5 pbw of component (B) may lead to insufficient crosslinking whereas more than 20 pbw of component (B) may result in a cured composition which is too hard and be uneconomical.

Component (C)

Component (C) is an ionic liquid which is an important distinguishing component of the inventive composition. The ionic liquids refer to fused salts which are liquid at room temperature, that is, normally fused salts, and specifically fused salts having a melting point of up to 50° C., preferably −100° C. to 30° C., and more preferably −50° C. to 20° C. These ionic liquids are characterized by having no vapor pressure (non-volatile) and by high heat resistance, incombustibility, and chemical stability.

The preferred ionic liquid consists of a quaternary ammonium cation and an anion. The quaternary ammonium cation is imidazolium, pyridinium or a cation $R^2_4 N^+$ wherein $R^2$ is a hydrogen atom or an organic group of 1 to 20 carbon atoms.

The organic groups represented by $R^2$ include monovalent hydrocarbon groups of 1 to 20 carbon atoms and alkoxyalkyl groups, for example. Illustrative examples include alkyl groups such as methyl, pentyl, hexyl and heptyl; aryl groups such as phenyl, tolyl, xylyl and naphthyl; aralkyl groups such as benzyl and phenethyl; cycloalkyl groups such as cyclopentyl, cyclohexyl and cyclooctyl; and alkoxyalkyl groups such as ethoxyethyl (—$CH_2CH_2OCH_2CH_3$). Two of the organic groups represented by $R^2$ may bond together to form a cyclic structure, and in this case, two $R^2$ taken together form a divalent organic group. The main chain of this divalent organic group may consist of carbon atoms or may further contain a heteroatom or atoms such as oxygen and nitrogen atoms. Typical divalent organic groups are divalent hydrocarbon groups, for example, alkylene groups of 3 to 10 carbon atoms and groups of the formula: —$(CH_2)_b$—O—$(CH_2)_c$— wherein b is an integer of 1 to 5, c is an integer of 1 to 5, and b+c is an integer of 4 to 10.

Examples of the cation $R^2_4N^+$ include methyltri-n-octylammonium cation, ethoxyethylmethylpyrrolidinium cation and ethoxyethylmethylmorpholinium cation.

The anion used herein is not critical. Preferred anions include $AlCl_4^-$, $Al_3Cl_8^-$, $Al_2Cl_7^-$, $ClO_4^-$, $PF_6^-$, $BF_4^-$, $CF_3SO_3^-$, $(CF_3SO_2)_2N^-$, and $(CF_3SO_2)_3C^-$, with $PF_6^-$, $BF_4^-$, $CF_3SO_3^-$, and $(CF_3SO_2)_2N^-$ being more preferred.

Examples of the ionic liquid consisting of a quaternary ammonium cation and an anion include methyltri-n-octylammonium bis(trifluoromethanesulfonyl)imide, ethoxyethylmethylpyrrolidinium bis(trifluoromethanesulfonyl)imide of the structural formula:

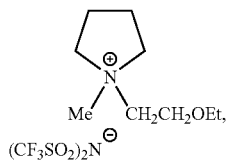

and ethoxyethylmethylmorpholinium bis(trifluoromethanesulfonyl)imide of the structural formula:

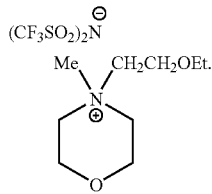

These ionic liquids may be used alone or in admixture.

An appropriate amount of component (C) compounded is 0.01 to 30% by weight, preferably 0.05 to 20% by weight, and more preferably 0.1 to 15% by weight, based on the weight of component (A). Less than 0.01% by weight of component (C) fails to exert the desired anti-fouling or fouling release effect whereas more than 30% by weight of component (C) may be uneconomical.

Other Components

In the inventive composition, catalysts may be added for promoting cure. Use may be made of various curing catalysts commonly used in conventional RTV compositions of the condensation curing type. Exemplary catalysts include metal salts of organocarboxylic acids such as lead 2-ethyloctoate, dibutyltin dioctoate, dibutyltin acetate, dibutyltin dilaurate, butyltin 2-ethylhexoate, iron 2-ethylhexoate, cobalt 2-ethylhexoate, manganese 2-ethylhexoate, zinc 2-ethylhexoate, stannous caprylate, tin naphthenate, tin oleate, tin butanoate, titanium naphthenate, zinc naphthenate, cobalt naphthenate, and zinc stearate; organotitanic acid esters such as tetrabutyl titanate, tetra-2-ethylhexyl titanate, triethanolamine titanate and tetra(isopropenyloxy)titanate; organotitanium compounds and organic titanium chelates such as organosiloxytitanium, β-carbonyltitanium, diisopropoxytitanium bis(ethylacetoacetate) and titanium tetra(acetylacetate); alkoxyaluminum compounds; aminoalkyl-substituted alkoxysilanes such as 3-aminopropyltriethoxysilane and N-(trimethoxysilylpropyl)ethylenediamine; amine compounds and salts thereof such as hexylamine and dodecylamine phosphate; quaternary ammonium salts such as benzyltriethylammonium acetate; alkali metal salts of lower fatty acids such as potassium acetate, sodium acetate and lithium bromate; dialkylhydroxylamines such as dimethylhydroxylamine and diethylhydroxylamine; and guanidine compounds and guanidyl group-containing silanes or siloxanes as represented by the following formulae.

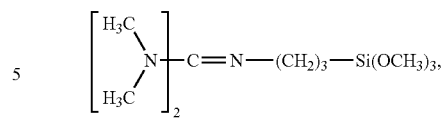

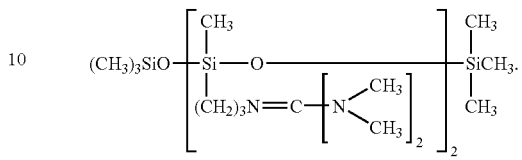

These catalysts may be used alone or in admixture.

When used, the amount of the curing catalyst is not particularly limited. It may be used in a catalytic amount. Typically, the catalyst is preferably used in an amount of 0.01 to 20 parts by weight, more preferably 0.1 to 10 parts by weight per 100 parts by weight of component (A). If the amount of the catalyst, when used, is below the range, the resulting composition may become less curable depending on the type of crosslinking agent. If the amount of the catalyst is above the range, the resulting composition may become less storage stable.

For the reinforcement or extending purpose, fillers may be used in the inventive composition. Suitable fillers include hydrophilic silica such as fumed silica and precipitated silica, hydrophobic silica obtained by surface treatment of the foregoing silica with hexamethyldisilazane, cyclic dimethylsiloxane or dimethyldichlorosilane, quartz, diatomaceous earth, titanium oxide, aluminum oxide, lead oxide, iron oxide, carbon black, bentonite, graphite, calcium carbonate, mica, clay, glass beads, glass microballoons, shirasu balloons, glass fibers, polyvinyl chloride beads, polystyrene beads, and acrylic beads. Of these, hydrophilic and/or hydrophobic silica having a BET specific surface area of at least 10 $m^2/g$, especially 50 to 500 $m^2/g$ is preferred.

When used, the amount of the filler compounded is typically 1 to 50 parts by weight, especially 5 to 30 parts by weight per 100 parts by weight of component (A) though not limited thereto. When used, an amount below the range of the filler may result in a cured composition with lower rubber physical properties, and an amount beyond the range of the filler may result in a composition having too high a viscosity to work as by mixing and coating.

In the inventive composition, optional additives may be compounded in ordinary amounts as long as the objects of the invention are not compromised. Suitable additives include plasticizers, colorants such as pigments, flame retardants, thixotropic agents, bactericides, fungicides, and adhesion improvers such as carbon-functional silanes having amino, epoxy or thiol groups (e.g., γ-glycidoxypropyltrimethoxysilane and aminopropyltriethoxysilane).

The inventive composition may be prepared by mixing the above-mentioned components in an ordinary manner. The resulting composition cures at room temperature and thus, the conditions under which the composition is cured are not particularly limited.

The inventive composition is applicable to underwater structures to form a coating on their surface. Suitable underwater structures include ships, harbor facilities, buoys, pipe lines, bridges, submarine stations, submarine oil well excavation units, power plant water conduits, fish culture nets and fixed shore nets. The cured coating is non-toxic and non-detrimental to the environment, and exhibits the anti-fouling or fouling release effect of preventing deposition and growth of aquatic organisms over a long term.

The coating of the inventive composition on the underwater structure typically has a thickness of 10 to 1,000 μm, and especially 50 to 500 μm, though is not limited thereto.

EXAMPLE

Examples and Comparative Examples are given below for further illustrating the invention although the invention is not limited thereto. All parts are by weight. The viscosity is a measurement at 25° C. by a rotational viscometer. The specific surface area is a measurement by the BET method.

Example 1

A composition was prepared by combining 90 parts of α,ω-dihydroxy-dimethylpolysiloxane having a viscosity of 1,500 mm$^2$/s with 15 parts of fumed silica having a specific surface area of 200 m$^2$/g and intimately mixing them under vacuum while heating at 150° C. for 2 hours. The mixture was then admixed under vacuum with 12 parts of vinyltris(methylethylketoxime)silane and 1 part of γ-glycidoxypropyltrimethoxysilane until uniform. The mixture was further admixed under vacuum with 1 part of methyltri-n-octylammonium bis(trifluoromethanesulfonyl)imide until uniform.

Example 2

A composition was prepared as in Example 1 except that ethoxyethylmethylpyrrolidinium bis(trifluoromethanesulfonyl)imide was used instead of the methyltri-n-octylammonium bis(trifluoromethanesulfonyl)imide.

Example 3

A composition was prepared as in Example 1 except that 0.1 part of ethoxyethylmethylpyrrolidinium bis(trifluoromethanesulfonyl)imide was used instead of 1 part of the methyltri-n-octylammonium bis(trifluoromethanesulfonyl)imide.

Example 4

A composition was prepared as in Example 1 except that ethoxyethylmethylmorpholinium bis(trifluoromethanesulfonyl)imide was used instead of the methyltri-n-octylammonium bis(trifluoromethanesulfonyl)imide.

Example 5

A composition was prepared by combining 90 parts of both end trimethoxysilylethylene-blocked dimethylpolysiloxane having a viscosity of 5,500 mm$^2$/s with 15 parts of fumed silica having a specific surface area of 200 m$^2$/g and intimately mixing them under vacuum while heating at 150° C. for 2 hours. The mixture was then admixed under vacuum with 8 parts of vinyltrimethoxysilane, 2 parts of diisopropoxytitanium bis(ethylacetoacetate), and 0.5 part of γ-glycidoxypropyltrimethoxysilane until uniform. The mixture was further admixed under vacuum with 1 part of ethoxyethylmethylpyrrolidinium bis(trifluoromethanesulfonyl)imide until uniform.

Comparative Example 1

A composition was prepared as in Example 1 except that the methyltri-n-octylammonium bis(trifluoromethanesulfonyl)imide was omitted.

Comparative Example 2

A composition was prepared as in Example 1 except that 15 parts of a both end trimethylsiloxy-blocked methylphenylsiloxane-dimethylsiloxane copolymer containing 5 mol % of phenyl groups and having a viscosity of 100 mm$^2$/s was used instead of 1 part of the methyltri-n-octylammonium bis(trifluoromethanesulfonyl)imide.

Comparative Example 3

A composition was prepared as in Example 1 except that a both end trimethylsiloxy-blocked dimethylpolysiloxane containing polyoxyethylene groups as side chains and having a viscosity of 100 mm$^2$/s and a HLB value of 2 was used instead of the methyltri-n-octylammonium bis(trifluoromethanesulfonyl)imide.

Comparative Example 4

A composition was prepared as in Example 1 except that a quaternary ammonium salt of benzyltriethylammonium acetate was used instead of the methyltri-n-octylammonium bis(trifluoromethanesulfonyl)imide.

Test

An epoxy base anti-corrosion paint was previously coated onto a plate to a thickness of 200 μm. Each of the compositions of Examples and Comparative Examples was coated thereon and kept at 23° C. and 50% RH for 7 days for curing to form a cured film of 300 μm thick. The thus coated plates were test specimens. In a suspension test, the specimens were suspended at a depth of 1.5 m in seawater at a Kanagawa seashore for 12 months. The deposition of shells such as barnacle and seaweed on the specimens was observed and rated as no, some or much deposits. The results are shown in Table 1.

TABLE 1

| | Aquatic organisms deposits | | | | | | | | |
|---|---|---|---|---|---|---|---|---|---|
| | Example | | | | | Comparative Example | | | |
| | 1 | 2 | 3 | 4 | 5 | 1 | 2 | 3 | 4 |
| 3 months | no | no | no | no | no | much | some | no | no |
| 6 months | no | no | no | no | no | much | much | much | much |
| 12 months | no | no | no | no | no | much | much | much | much |

Japanese Patent Application No. 2004-266636 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An anti-fouling or fouling release condensation curing organopolysiloxane composition comprising in admixture,
    (A) a base polymer in the form of a diorganopolysiloxane having at least two silicon atom-bonded hydroxyl and/or hydrolyzable groups in a molecule,
    (B) a silane having at least two hydrolyzable groups in a molecule and/or a partial hydrolytic condensate thereof, and
    (C) 0.01 to 30% by weight based on component (A) of an ionic liquid, wherein said ionic liquid consists of a quaternary ammonium cation selected from the group consisting of a methyltri-n-octylammonium cation, an ethoxyethylmethylpyrrolidinium cation, and an ethoxyethylmethylmorpholinium cation and an anion selected from the group consisting of $AlCl_4^-$, $Al_3Cl_8^-$, $Al_2Cl_7^-$, $ClO_4^-$, $PF_6^-$, $BF_4^-$, $CF_3SO_3^-$, $(CF_3SO_2)_2N^-$, and $(CF^3SO_2)_3C^-$ and said ionic liquid has a melting point in the range of −50° C. to 20° C.

2. The composition of claim 1, wherein said base polymer (A) is a diorganopolysiloxane having the general formula (1):

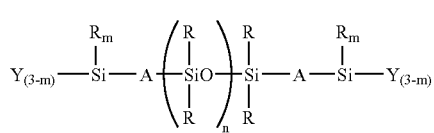
(1)

wherein R is independently a substituted or unsubstituted monovalent hydrocarbon group, A is independently an oxygen atom or a divalent hydrocarbon group of 1 to 8 carbon atoms, Y is independently a hydroxyl or hydrolyzable group, m is an integer of 0 to 2, and n is such a number that the diorganopolysiloxane has a viscosity of 20 to 1,000,000 mm²/s at 25° C.

3. The composition of claim 1, wherein component (B) is a silane of the general formula (2):

$$R^1_a SiX_{4-a} \quad (2)$$

wherein $R^1$ is independently a substituted or unsubstituted monovalent hydrocarbon group of 1 to 6 carbon atoms, X is independently a hydrolyzable group, and "a" is an integer of 0 to 2, and/or a partial hydrolytic condensate thereof.

4. The composition of claim 1, further comprising hydrophilic and/or hydrophobic silica having a BET specific surface area of at least 10 m²/g as a filler.

5. The composition of claim 1, wherein said ionic liquid is methyltri-n-octylammonium bis(trifluoromethanesulfonyl)imide.

6. The composition of claim 1, wherein said ionic liquid is ethoxyethylmethylpyrrolidinium bis(trifluoromethanesulfonyl)imide.

7. The composition of claim 1, wherein said ionic liquid is ethoxyethylmethylmorpholinium bis(trifluoromethanesulfonyl)imide.

8. An underwater structure coated with an anti-fouling or fouling release condensation curing organopolysiloxane composition in the cured state, said composition comprising in admixture, (A) a base polymer in the form of a diorganopolysiloxane having at least two silicon atom-bonded hydroxyl and/or hydrolyzable groups in a molecule, (B) a silane having at least two hydrolyzable groups in a molecule and/or a partial hydrolytic condensate thereof, and (C) 0.01 to 30% by weight based on component (A) of an ionic liquid, wherein said ionic liquid consists of a quaternary ammonium cation selected from the group consisting of a methyltri-n-octylammonium cation, an ethoxyethylmethylpyrrolidinium cation, and an ethoxyethylmethylmorpholinium cation and an anion selected from the group consisting of $AlCl_4^-$, $Al_3Cl_8^-$, $Al_2Cl_7^-$, $ClO_4^-$, $PF_6^-$, $BF_4^-$, $CF_3SO_3^-$, $(CF_3SO_2)_2N^-$, and $(CF^3SO_2)_3C^-$ and said ionic liquid has a melting point in the range of −50° C. to 20° C.

* * * * *